Patented Oct. 15, 1940

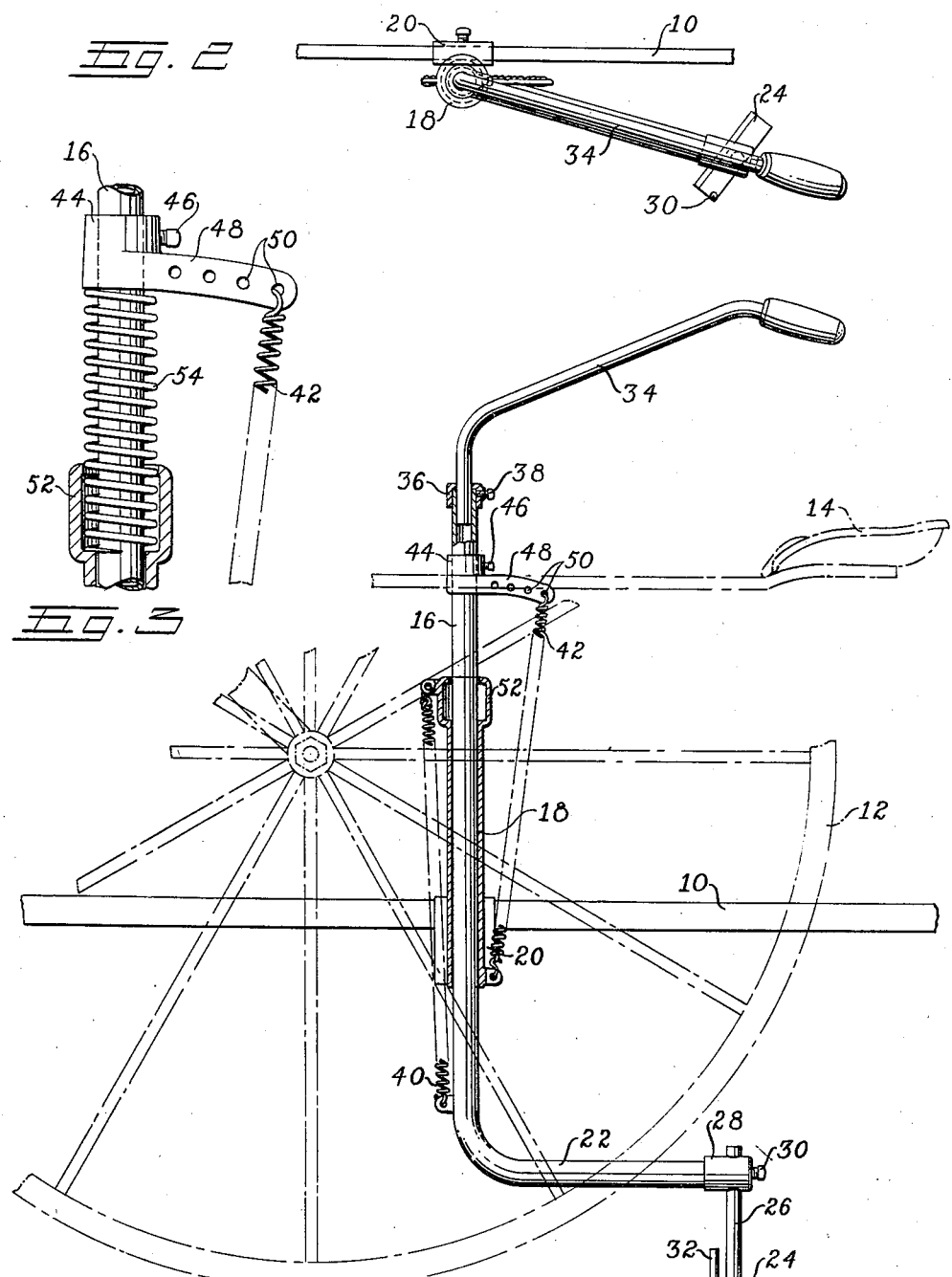

2,218,187

UNITED STATES PATENT OFFICE 2,218,187

CULTIVATOR

Everett Wigle, Kingsville, Gosfield South Township, Ontario, Canada

Application August 19, 1938, Serial No. 225,797

5 Claims. (Cl. 97—179)

This invention relates to agricultural implements and more particularly to a farming tool especially adapted for use on a cultivator. The invention relates primarily to an improvement of the hoeing attachment described in my Patent No. 1,858,652.

An important object of this invention is to provide a farming tool of the type shown in my prior patent which is of low cost construction consisting of few parts easily and quickly assembled together. Another important object of this invention is to provide a hoeing attachment which when assembled upon a cultivator is capable of self-adjustment as it operates in conjunction with the cultivator. Another object of the invention is to provide a hoeing attachment for cultivators which is capable of precise manual adjustment before and during use. Another object of the invention is to provide a hoeing attachment for cultivators which is strong, rugged and will withstand considerable abuse and which is continuously lubricated so that minimum wear occurs.

The invention comprises essentially a member and a support therefor which when the support is attached to a cultivator disposes the member in an upright condition with one end thereof adjacent to the ground for engagement therewith. The ground engaging end of the member is provided with any form of a farm implement such as a hoe. The member is floatingly supported relative to its support on the cultivator by a novel spring means which resistingly allows the member to rise and fall and turn automatically as the ground engaging end of the member operates upon the ground. The novel means for floatingly supporting the member for such movement comprises springs acting opposed to one another and tensioned between the member and its support. Novel means is provided for adjusting the tension of the springs to vary the floating position assumed by the member and for adjusting the resistance of the member to turning movement. A handle may be provided within reach of the operator of the cultivator enabling the operator to impose manual control over the up and down and turning movement of the member.

Various other objects, advantages and meritorious features of the invention will become more fully apparent from the following specification, appended claims, and accompanying drawing, wherein:

Figure 1 is a side elevation of the tool partially broken away showing the manner of assembling the same on a cultivator, Figure 2 is a top plan view of the tool, and Figure 3 is a detail view of a modified form of construction.

Referring in detail to the drawing, the device illustrated therein forms one embodiment of the invention. In use it is preferred that two such devices be attached to the frame of a cultivator on the inside of the ground engaging wheels thereof. Usually, such cultivators have parallel spaced side bars 10 and wheels 12 disposed outside of the side bars. A seat 14 is disposed centrally above the side bars and rearwardly of the axle of the wheels as shown. It is preferred that each side bar of such a cultivator form a base support for one of the devices illustrated herein so that a pair of devices are carried by the cultivator. It is understood, however, that the mode of attachment of the devices embodying the invention may be varied to suit the construction of the cultivators upon which it is desired to use them.

The farming device forming the feature of this invention comprises an elongated member or tubular rod 16 movably mounted in a support in the form of a sleeve 18 attachable to a side bar 10 of the cultivator. The sleeve is provided with a bracket 20 for securing the sleeve in upright position to the side bar 10. When thus attached to the side bar, the rod 16 extends vertically through the sleeve. The rod is provided with a horizontally bent section 22 on the lower end thereof to which various types of ground tilling implements may be removably secured. As shown, a hoeing device 24 is attached to the extremity of the bent end section 22 of the rod. This device may be removably secured in position by insertion of the shank 26 through a hole in a cylindrical member 28 fixed upon the end of the section 22 and held in place by a set screw 30. The hoeing end of the device may be provided with a guiding post 32 which projects above the ground when the hoe proper is operating below the top of the ground and indicates to the operator the position of the hoe.

The upper end of the rod 16 is open and a solid rod 34 is inserted therein to form a control arm for the device. The rod may be bent toward the operator's seat and a handle provided thereon to facilitate manual control. A collar 36 may be removably secured to the top open end of rod 16 to close the opening thereinto and form a support for a set screw 38 which detachably secures the handle rod 34 in place.

The tubular rod 16 is rotatable and slidable vertically in the sleeve 18 as is apparent. To floatingly mount the rod relative to the sleeve and to counterbalance the weight thereof, a pair of springs are provided which act upon the rod in opposed relationship. As shown in Figure 1, one coil spring 40 is tensioned between the upper end portion of the sleeve 18 and the bottom end portion of rod 16. The spring yieldingly acts to raise the rod 16 within the sleeve. A second coil spring 42 is tensioned between the bottom end portion of the sleeve 18 and the upper end portion of rod 16. This spring acts in opposition to spring 40 and yieldingly urges the rod downwardly in the sleeve. Between the action of the springs, the rod 16 and associated parts assumes a position intermediate the extreme positions of its slidable movement in the sleeve 18.

The tension and point of attachment of one of the springs such as spring 42 is adjustable. As shown, a collar 44 is slidably fitted on rod 16 and is fixed thereto against movement by a set screw 46. The collar is provided with a laterally extending arm 48 having a series of spaced apertures 50 therethrough. The upper end of coil spring 42 is hooked into one of these apertures as shown. Slidable adjustment of the collar 44 up and down on the rod 16 will vary the tension of the spring and as a consequence the balanced position assumed by the rod and its associated parts. Lateral adjustment of the upper end of the coil spring 42 along the arm will vary the resistance of the spring to turning or rotational movements of the rod 16 in the sleeve. The farther out the end of the spring is adjusted the more it is tensioned per given rotational movement of the rod and as a consequence the stiffer the resistance it offers to such rotational movements. Thus by varying the tension of spring 42, the depth of hoeing portion in the ground may be adjusted, and by varying the lateral position of its attachment, the resistance of the hoeing portion to turning movements is adjusted. The yielding operation of the hoe or other form of farming implement substituted therefor both up and down and right and left enables the hoe to pass about obstructions in the ground and yet automatically return to the desired depth and angle of operation.

The top of the sleeve 18 may be widened to form an annular chamber 52 to hold an excess amount of lubricating material. A small amount of this lubricating material will continually drain down between rod 16 and the inner surface of the sleeve 18 and keep the parts well oiled. The top edge of the chamber may be turned inwardly to form a lip which acts to prevent lubricating material in the chamber from splashing out.

In place of spring 40 a coil spring 54 encircling the rod 16 may be used. This spring is compressed between collar 44 and the bottom of the annular chamber 52 which acts as a seat therefor. This spring acts in opposition to coil spring 42 and causes the rod 16 to assume a yielding balanced position between the two extreme positions of its movement in sleeve 18.

In use, it is possible for the operator to vary the depth of the hoe 24 by adjusting the position of collar 44 on rod 16 and to vary the resistance of the rod to turning movement by shifting the attachment of the upper end of the spring laterally along the arm 48. These adjustments will be made in accordance with the condition of the ground at the time of use. At any time the operator can impose his control upon the action of the hoe by grasping the handle on rod 34 and either shifting the rod up or down or turning the same right or left.

What I claim:

1. In combination with a cultivator, an attachment therefor comprising a member extending from the ground to a height within reach of the operator driving the cultivator and having a farming implement on its bottom end and a handle on its upper end, a support on the cultivator through which said member extends, said member mounted for vertical bodily movement through said support and for rotation in said support, and a pair of springs extending between the support and the member and acting opposite to one another to floatingly position the member between the extreme positions of its movement, and means for adjusting the end of one of the springs laterally relative to the path of movement of the rod to vary the degree with which said spring resists rotating movement of the member.

2. In combination with a cultivator, a ground engaging implement bodily movable in a vertical path, an elongated support secured to the cultivator through which the implement bodily moves, a coiled spring tensioned between a point adjacent the top end of the support and a point adjacent to the bottom end of the implement and yieldingly acting to raise the implement relative to the support, and a second spring tensioned between a point adjacent to the bottom of said support and a point adjacent to the top of said implement, said springs opposing one another and yieldingly floatingly supporting the implement relative to the support at a position intermediate the extreme positions of its movement.

3. An agricultural implement attachable to farm cultivators comprising, in combination, a sleeve, a rod slidable in said sleeve and projecting beyond opposite ends thereof, a farming tool on one end of said rod, a manual control handle on the other end of said rod, a coil spring tensioned to said sleeve adjacent one end and to a portion of the rod projecting from the other end of the sleeve, and a second coil spring tensioned to said sleeve adjacent to the other end thereof and to a portion of the rod projecting through the first mentioned end of the sleeve, said springs floatingly mounting said rod relative to the sleeve and yieldingly positioning the rod between the extreme positions of its movement through the sleeve.

4. The invention described in claim 3 characterized by the fact that the tension of one of the springs is adjustable to vary the yielding position in which the rod is disposed.

5. An agricultural implement attachable to a farm cultivator comprising, in combination, a sleeve, a rod slidable and rotatable in said sleeve and having portions projecting from opposite ends thereof, a farming tool secured to one end of the rod, a handle secured to the other end of the rod, a pair of springs extending between said sleeve and said rod and acting opposite to one another to yieldingly position the rod between the extreme positions of its movement through the sleeve, one of said springs being tensioned between the rod and the sleeve, means for varying the position of attachment of one end of said tension spring to vary the position assumed by the rod when the springs equally counteract one another, and means for adjusting the attachment of one end of the said tension spring laterally relative to the axis of the sleeve to vary the force with which the spring resists rotating movement of the rod relative to the sleeve.

EVERETT WIGLE.